R. T. AXE.
TRAP DOOR FOR THE VESTIBULES OF RAILWAY CARS.
APPLICATION FILED MAY 29, 1911.
1,098,310.
Patented May 26, 1914.
3 SHEETS—SHEET 1.
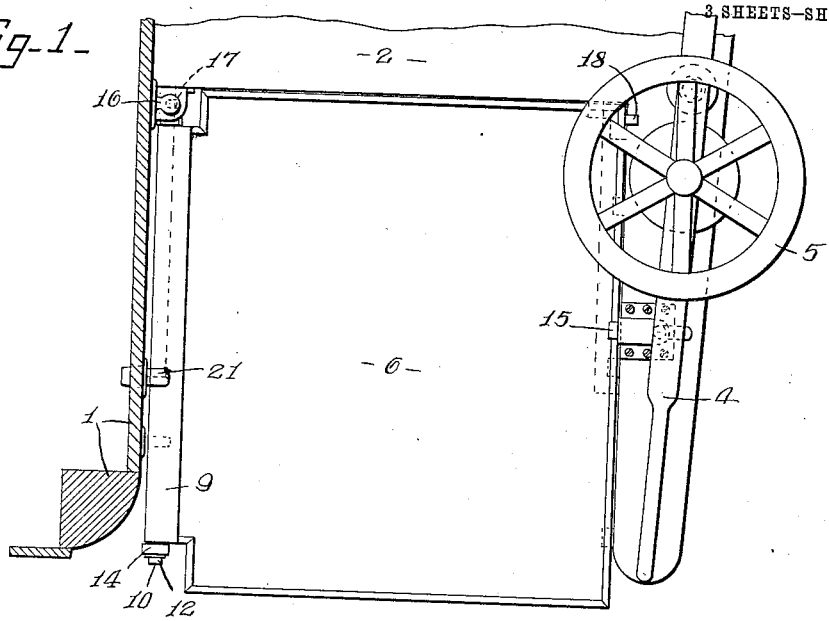
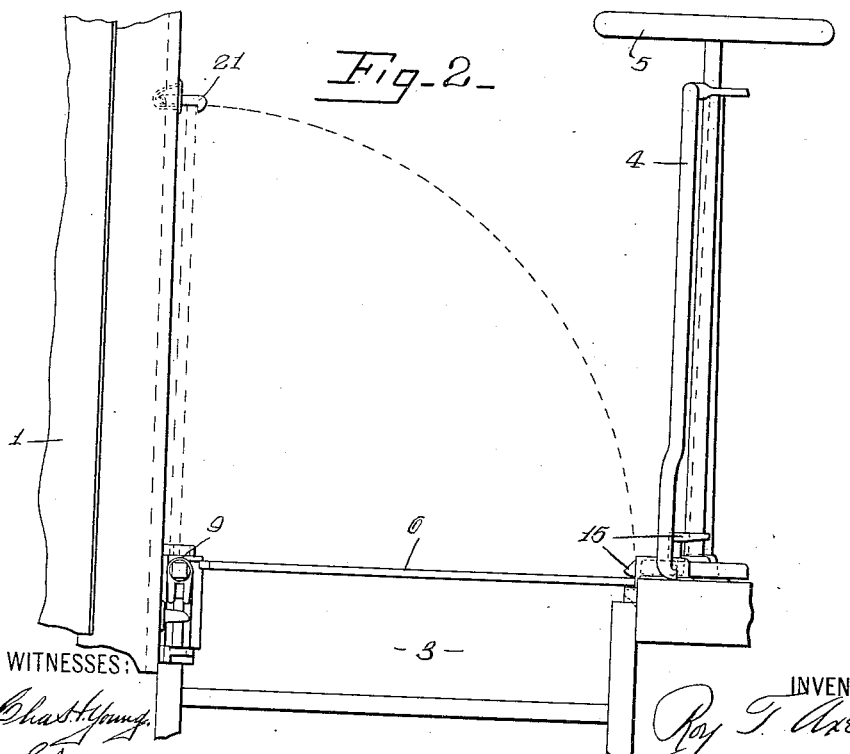
WITNESSES:
Chas H Young
S Davis
INVENTOR
Roy T Axe
BY
Parsons Hall Bradley
ATTORNEYS R. T. AXE.
TRAP DOOR FOR THE VESTIBULES OF RAILWAY CARS.
APPLICATION FILED MAY 29, 1911.
1,098,310.
Patented May 26, 1914.
3 SHEETS—SHEET 2.
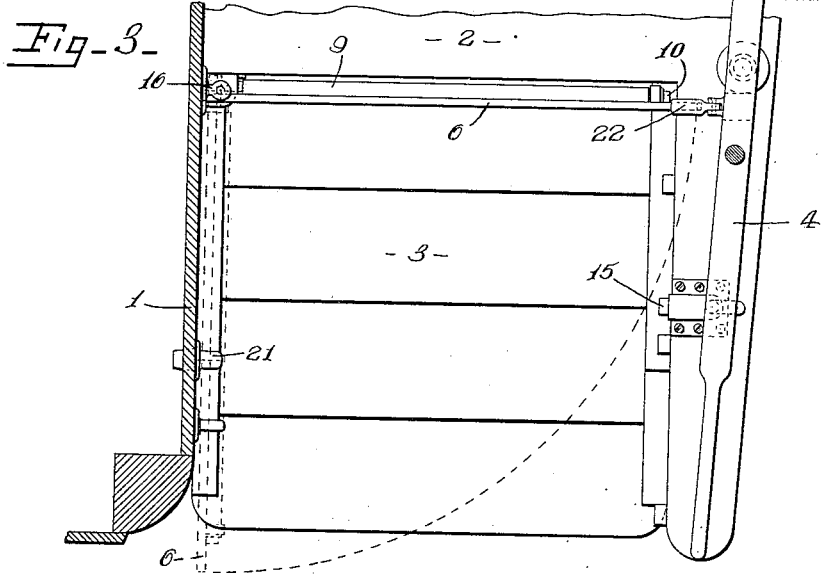
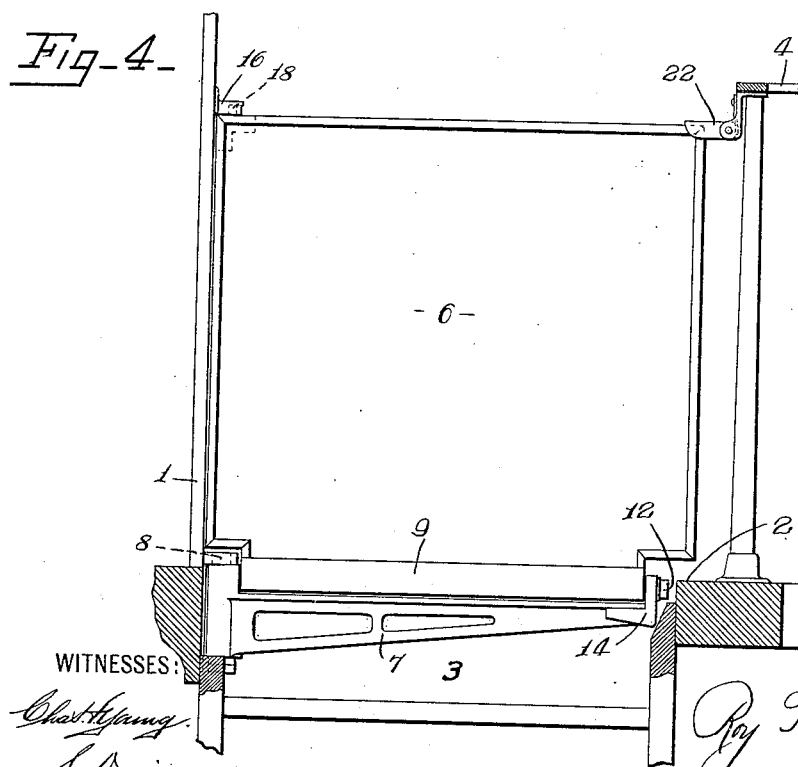

R. T. AXE.
TRAP DOOR FOR THE VESTIBULES OF RAILWAY CARS.
APPLICATION FILED MAY 29, 1911.
1,098,310.
Patented May 26, 1914.
3 SHEETS—SHEET 3.
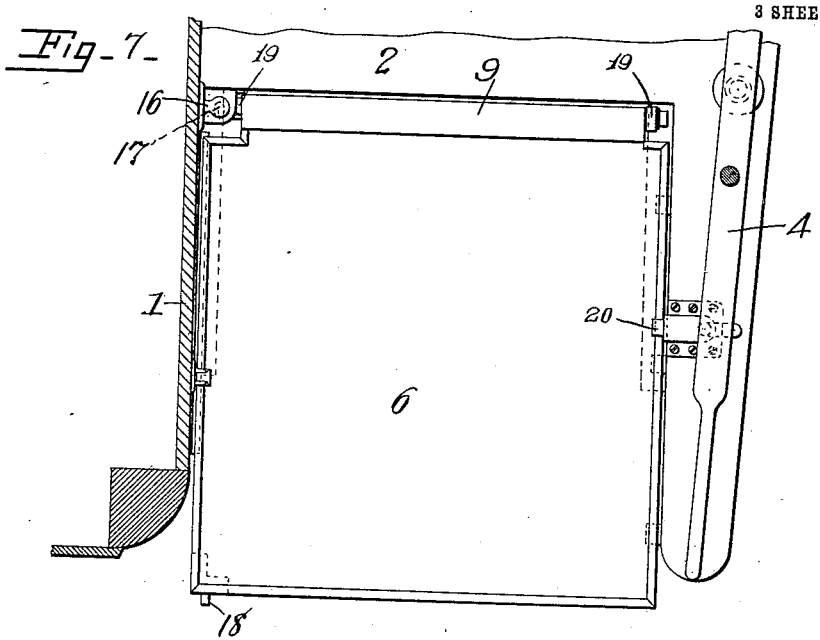
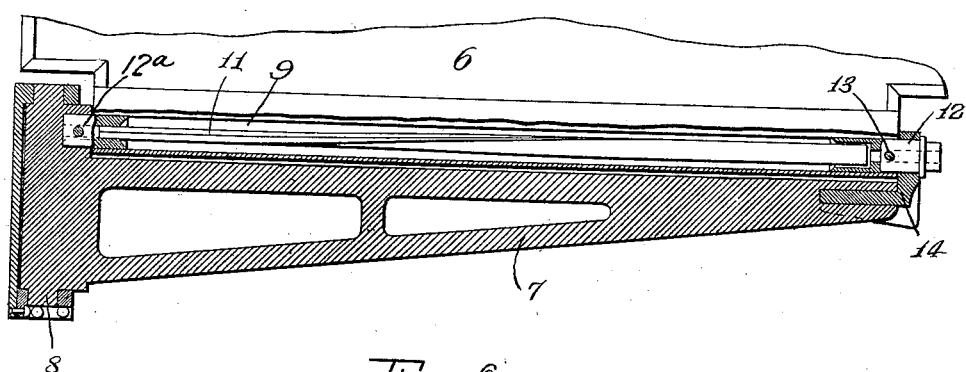
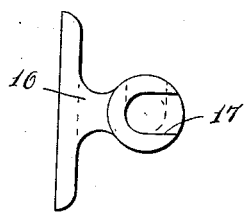
WITNESSES:
Chas H Young
S. Davis
INVENTOR
Roy T. Axe
BY
Parsons Haer & Bodeep
ATTORNEYS

UNITED STATES PATENT OFFICE.

ROY T. AXE, OF SYRACUSE, NEW YORK, ASSIGNOR TO OLIVER M. EDWARDS, OF SYRACUSE, NEW YORK.

TRAP-DOOR FOR THE VESTIBULES OF RAILWAY-CARS.

1,098,310.  Specification of Letters Patent.  Patented May 26, 1914.

Application filed May 29, 1911. Serial No. 630,028.

*To all whom it may concern:*

Be it known that I, ROY T. AXE, of Syracuse, in the county of Onondaga and State of New York, have invented a certain new and useful Trap-Door for the Vestibules of Railway-Cars, of which the following is a specification.

This invention relates to trap doors for railway car vestibules and has for its object a trap door which is movable into and out of position to serve as a gate at the top of the steps of the vestibule, and it consists in the combinations and constructions hereinafter set forth and claimed.

In describing this invention reference is had to the accompanying drawings in which like characters designate corresponding parts in all the views.

Figure 1 is a top plan of a portion of a railway car vestibule embodying my invention, contiguous parts of the body of the car being shown in section. Fig. 2 is a side elevation of parts seen in Fig. 1. Fig. 3 is a view similar to Fig. 1, the trap door being shown in its position occupied when serving as a gate. Fig. 4 is a vertical section on a plane to the outside of, and contiguous to, the door when occupying the position shown in Fig. 3; the door and associated parts being shown in elevation. Fig. 5 is an enlarged detail view of the hinged carrier for the trap door and contiguous parts. Fig. 6 is a detail view of one of the separable hinge members. Fig. 7 is a view similar to Fig. 1 illustrating a slightly different arrangement of the parts from that shown in Fig. 1.

1 designates the end portion of a railway car; 2 the platform of the vestibule thereof; 3 the flight of steps leading downwardly from the platform; 4 the hand rails on the platform; and 5 the hand brake wheel usually located on the platform or within the vestibule of a railway car. All of said parts may be of any desirable form, size and construction.

6 is the trap door normally arranged in horizontal position covering the steps 3 and flush with the platform 2, this door being movable from its normal position into position to serve as a gate at the top of the steps 3 and out of such position into a position at one side of the steps.

In the illustrated embodiment of my invention the trap door is movable about a horizontal axis into one of its vertical positions and about an upright axis from either of its vertical positions to the other, such vertical axis being preferably located at one side of the steps 3 near one of the inner corners of the door 6. As here illustrated the trap door 6 is hinged to a carrier 7 and is movable about a horizontal axis and such carrier is hinged at 8 to the car 1 or contiguous parts of the vestibule, and swings horizontally beneath the plane of the platform 2, the axis of the hinge 8 of the carrier extending substantially vertically and meeting or intersecting the horizontal axis of the door 6. Such hinge is located at one side of the steps 3 and near the meeting edges of the platform and door 6. The door 6 is here shown as provided with a barrel 9 at one of its side edges which is hinged at 10 to the carrier, one end of the barrel being located near the axis 8 of the carrier and the other near the free end thereof.

In the illustrated exemplification of my invention, the carrier 7 is an arm having trunnions coöperating with parts on the car for forming a vertical hinge 8 and the upper edge of the arm is provided with a recess for receiving the barrel 9. The carrier or arm 7 is movable in the step opening in the platform and the part of the door coöperating with the carrier 7 is preferably of less length than the latter and the major part of the door is preferably of greater length than said carrier.

In the preferable embodiment of my invention, the hinge connection between the door and the carrier is provided by plugs 12, 12ª projecting from the opposite end walls of the recess in the carrier 7 and extending into opposite ends of the barrel 9. The plug 12 is free to rotate in the carrier and is connected by a pin 13 to the barrel 9 so as to move with the door, while the plug 12 is held from rotation in the carrier by a suitable key or pin. Means are preferably provided for automatically moving the door when released from its horizontal position toward its vertical position and as here shown, said means comprises a torsion spring 11 held at its opposite ends in axial openings in the plugs 12, 12ª. As illustrated herein the outer end of the carrier or arm 7 is preferably formed by a detachable plate 14 having as a part thereof a wall in which is mounted the plug 12.

The trap door is normally prevented from movement about its axis under tension of the spring 11, by means of a catch 15 carried by the platform and adapted to be operated by the foot to be moved out of operative position and permit the trap door 6 to be raised from its position shown in Figs. 1 and 2 to that shown in Figs. 3 and 4 and in dotted lines Fig. 2. This catch 15 may be of any desirable form, size and construction and as the details of construction thereof form no part of this invention further description is thought to be unnecessary.

The door is guided in its movement about its vertical axis, that is the axis of the carrier 7, by fixed and movable hinge members, the fixed hinge member being arranged with its axis in vertical alinement with the hinge pins 8 of the support 7, and the other hinge member being carried by the free edge of the door 6 and movable into interlocking engagement with the fixed member when the door is swung to its position shown in Figs. 3 and 4.

As shown in Figs. 1, 3, 4 and 6, the fixed hinge member 16 is secured to the rear wall 1 of the car body and is formed with an open sided socket 17, the axis of which is alined with the axis of the hinge pins 8 of the carrier 7, and the movable member comprises a pin 18 projecting from the free edge of the door 6 and movable through the open side of the socket 17 during the movement of the door from its position shown in Figs. 1 and 2 to that shown in Figs. 3 and 4. After the trap door 6 has been moved to one of its vertical positions, it may be swung about its upright axis to occupy the other of its vertical positions.

As illustrated in Figs. 1, 2, 3, and 4 the horizontal axis of the trap door normally extends along one side of the steps 3 so that when the trap door is released by pressing the catch 15, the door swings up into a vertical position at one side of the steps 3 so that the steps are unobstructed, and from this last-mentioned position, the door may be swung by hand about its vertical axis into the position shown in Figs. 3 and 4, in which position it serves as a gate at the top of the steps 3. However, as seen in Fig. 7, the carrier 19 may be normally arranged along the meeting edges of the door and the platform so that when the latch 20 is released the door will first swing about its horizontal axis into position to serve as a gate and thereafter it may be swung by hand from its gate position into the position at one side of the steps 3. The door is held in either of its upright positions by catches 21 and 22, respectively, which may be of any desirable form, size and construction.

What I claim is:

1. A railway car vestibule having a platform, steps leading downwardly from the platform, and a trap door normally covering the steps and movable from its normal position into position to serve as a gate at the top of the steps, substantially as and for the purpose described.

2. A railway car vestibule having a platform, steps leading downwardly from the platform, and a trap door for normally covering the steps and movable from a horizontal position to a vertical position across the top of the steps in position to prevent egress from the car by way of the steps, substantially as and for the purpose specified.

3. A railway car vestibule having a platform, steps leading downwardly from the platform, and a trap door for normally covering the steps and movable from its normal position into a vertical position at one side of the steps or into a vertical position at the top of the steps, substantially as and for the purpose set forth.

4. A railway car vestibule having a platform, steps leading downwardly from the platform, and a trap door for normally covering the steps and movable from its normal position into a vertical position at one side of the steps or into a vertical position at the top of the steps, and means for holding the trap door in either of such vertical positions, substantially as and for the purpose described.

5. A railway car vestibule having a platform, steps leading downwardly from the platform, and a trap door for normally covering the steps and movable about horizontal and upright axes, the upright axis being located near the inner edge of the trap door, substantially as and for the purpose set forth.

6. A railway car vestibule having a platform, steps leading downwardly from the platform, and a trap door for normally covering the steps and movable about horizontal and upright axes, the upright axis being located near the inner edge of the trap door and near the meeting edges of the trap door and the platform, substantially as and for the purpose described.

7. A railway car vestibule having a platform, steps leading downwardly from the platform, and a trap door movable about horizontal and upright axes intersecting near one of the inner corners contiguous to the platform, substantially as and for the purpose set forth.

8. A railway car vestibule having a platform, steps leading downwardly from the platform, a hinged carrier movable about a vertical axis, and a trap door hinged to said carrier and located above the same and movable about a horizontal axis, substantially as and for the purpose described.

9. A railway car vestibule having a platform, steps leading downwardly from the platform, a hinged carrier movable about a vertical axis, and a trap door hinged to the carrier and movable about a horizontal axis, the carrier being movable about its axis horizontally below the plane of the platform, and the axis thereof being arranged at one side of the steps and near the meeting edges of the platform and the door when the door is in its normal position, substantially as and for the purpose specified.

10. A railway car vestibule having a platform, steps leading downwardly from the platform, a hinged carrier movable about a vertical axis, a trap door hinged to the carrier and movable about a horizontal axis and hinge members, one being fixed and located with its axis in vertical alinement with the vertical axis of the carrier, and the other being carried by the door and movable into engagement with the fixed member as the door approaches the limit of its movement about its horizontal axis, substantially as and for the purpose set forth.

11. A railway car vestibule having a platform, steps leading downwardly from the platform, a hinged carrier movable about a vertical axis, a trap door hinged to said carrier and movable about a horizontal axis and hinge members, one being fixed and formed with a socket open at one side, the axis of the socket being arranged in vertical alinement with the axis of the carrier, and the other member comprising a pin associated with the door and movable into the socket through the open side thereof as the door approaches the limit of its movement about its axis, substantially as and for the purpose described.

12. A railway car vestibule having a platform, steps leading downwardly from the platform, a hinged carrier movable about a vertical axis, a trap door hinged to said carrier and movable about a horizontal axis, the trap door being normally arranged in horizontal position, a spring tending to raise the door into vertical position and the carrier being movable about its vertical axis for carrying the door from the vertical position at the top of the steps into a position at one side of the steps, means for normally holding the door from movement by its spring, and means for holding the trap door in either of its upright positions, substantially as and for the purpose specified.

13. The combination with a car having a platform provided with a step-opening and steps located therein, of a horizontal arm pivotally supported at one end from the car to swing in the step-opening on a vertical axis, and a trap door carried by said arm and pivotally connected thereto.

14. The combination with a car having a platform provided with a step-opening and steps located therein, of a horizontal arm pivotally supported at one end from the car and provided in its upper edge with a recess, and a trap door having a part extending into said recess and pivotally connected to the end walls thereof.

15. The combination with a car having a platform provided with a step-opening therein and steps located in the opening, of an arm provided at one end with trunnions engaging a part of the car for pivotally supporting the arm from the car, said arm having a recess in its upper portion, a trap door having a part of less width than its major portion, said part extending into the recess, and a pivotal connection between said part and the end walls of the recess.

16. The combination with a car having a platform with a step-opening therein and steps located in the opening, of an arm provided at one end with trunnions engaging a part of the car for pivotally supporting the arm from the car, said arm having a recess in its upper portion, a trap door having a part extending into the recess, and a pivotal connection between said part and the end walls of the recess, said pivotal connection comprising plugs held in the end walls of the recess and engaging said part of the trap door.

17. The combination with a car having a platform with a step-opening therein and steps located in the opening, of an arm provided at one end with trunnions engaging a part of the car for pivotally supporting the arm from the car, said arm having a recess in its upper portion, a trap door having a part of less width than its major portion, said part extending into the recess, and a pivotal connection between said part and the end walls of the recess, said pivotal connection comprising plugs held in the end walls of the recess and projecting into the recess in the arm, one of said plugs being rotatably mounted in the arm and non-rotatably connected to the trap door and the other plug being non-rotatably mounted in the arm and rotatably mounted in the trap door, and a torsional spring held at its opposite ends by said plugs.

18. The combination with a car platform provided with a step opening, and steps located therein, of a trap door connected to the car by vertical and horizontal hinge connections, the vertical connection being located at one corner of the door, and a detachable hinge connection including a part located at another corner of the door removed from the horizontal hinge connection, and a part carried by the car and having a bearing arranged in position alined with the vertical connection in order to receive the former part when the door is in vertical position, substantially as and for the purpose set forth.

In testimony whereof, I have hereunto signed my name in the presence of two attesting witnesses, at Syracuse, in the county of Onondaga, in the State of New York, this 22nd day of May, 1911.

ROY T. AXE.

Witnesses:
  JAMES PARRISH,
  CHAS. H. YOUNG.

Copies of this patent may be obtained for five cents each, by addressing the "Commissioner of Patents, Washington, D. C."